(12) United States Patent
Tesson et al.

(10) Patent No.: US 12,241,184 B2
(45) Date of Patent: Mar. 4, 2025

(54) METHOD FOR MANUFACTURING A RING SECTOR

(71) Applicant: SAFRAN CERAMICS, Le Haillan (FR)

(72) Inventors: Thierry Guy Xavier Tesson, Moissy-Cramayel (FR); Eric Philippe, Moissy-Cramayel (FR); Marie Lefebvre, Moissy-Cramayel (FR); Aline Planckeel, Moissy-Cramayel (FR)

(73) Assignee: SAFRAN CERAMICS, Le Haillan (FR)

(*) Notice: Subject to any disclaimer, the term of this patent is extended or adjusted under 35 U.S.C. 154(b) by 368 days.

(21) Appl. No.: 17/616,604

(22) PCT Filed: Jun. 3, 2020

(86) PCT No.: PCT/FR2020/050952
§ 371 (c)(1),
(2) Date: Dec. 3, 2021

(87) PCT Pub. No.: WO2020/245545
PCT Pub. Date: Dec. 10, 2020

(65) Prior Publication Data
US 2022/0235498 A1    Jul. 28, 2022

(30) Foreign Application Priority Data

Jun. 3, 2019 (FR) ...................................... 1905867

(51) Int. Cl.
*D03D 25/00* (2006.01)
*D06M 23/00* (2006.01)

(52) U.S. Cl.
CPC .......... *D03D 25/005* (2013.01); *D06M 23/00* (2013.01)

(58) Field of Classification Search
CPC ...... D03D 25/005; D03D 41/004; D03D 1/00; D03D 15/44; D03D 15/573; D03D 15/55;
(Continued)

(56) References Cited

U.S. PATENT DOCUMENTS

| 4,922,968 A | 5/1990 | Boettger et al. |
| 2011/0277869 A1* | 11/2011 | Coupe .................. D03D 25/005 |
| | | 139/408 |

FOREIGN PATENT DOCUMENTS

| EP | 1379716 A1 | 1/2004 |
| WO | WO 03/023104 A1 | 3/2003 |
| WO | WO 2018/179878 A1 | 10/2018 |

OTHER PUBLICATIONS

International Patent Application No. PCT/FR2020/050952, International Search Report and Written Opinion dated Oct. 16, 2020, 10 pgs.

(Continued)

*Primary Examiner* — Camie S Thompson
(74) *Attorney, Agent, or Firm* — Cozen O'Connor

(57) ABSTRACT

The invention relates to a three-dimensionally woven multilayer fibrous structure (20) having the same number of warp yarns woven at any level along the warp direction, the fibrous structure (20) comprising, in the warp direction, a first part (22) and a second part (24), the first part (22) having a thickness measured in a direction perpendicular to the warp and weft directions, greater than the second part (24), characterised in that the spacing between two weft planes along the warp direction is greater in the second part than in the first part (22), and in that the number of weft yarns is lower in the second part (24) than in the first part (22).

20 Claims, 2 Drawing Sheets

(58) Field of Classification Search
CPC ...... D03D 15/275; D03D 15/43; B29B 11/16; B29B 11/00; D06M 23/00; B29C 70/222; B29C 70/08; B32B 5/263; B32B 5/06; B32B 5/024; B32B 2260/023; D10B 2101/12; D10B 2505/12; D10B 2505/02
See application file for complete search history.

(56) References Cited

OTHER PUBLICATIONS

French Application No. 1905867; Search Report dated Mar. 13, 2020; 21 pgs.

* cited by examiner

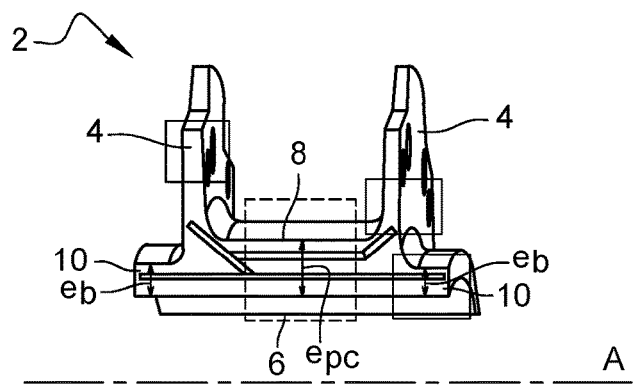
Fig. 1
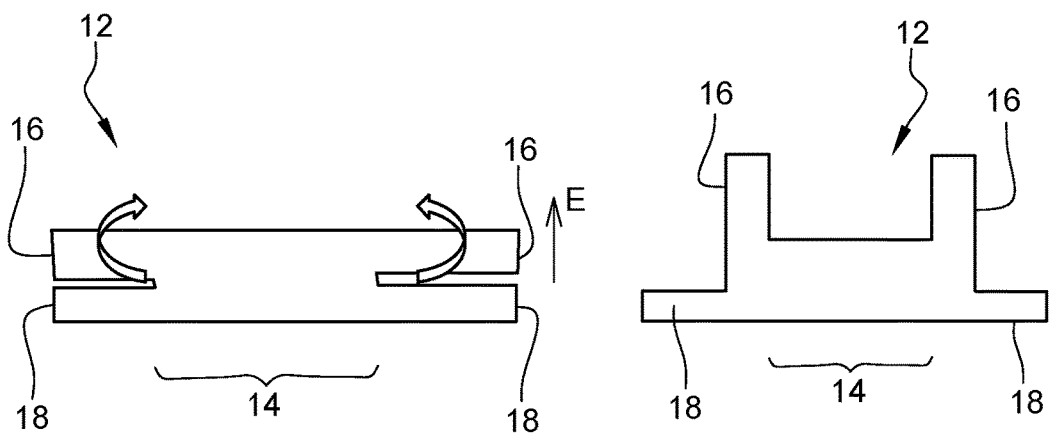
Fig. 2
Fig. 3
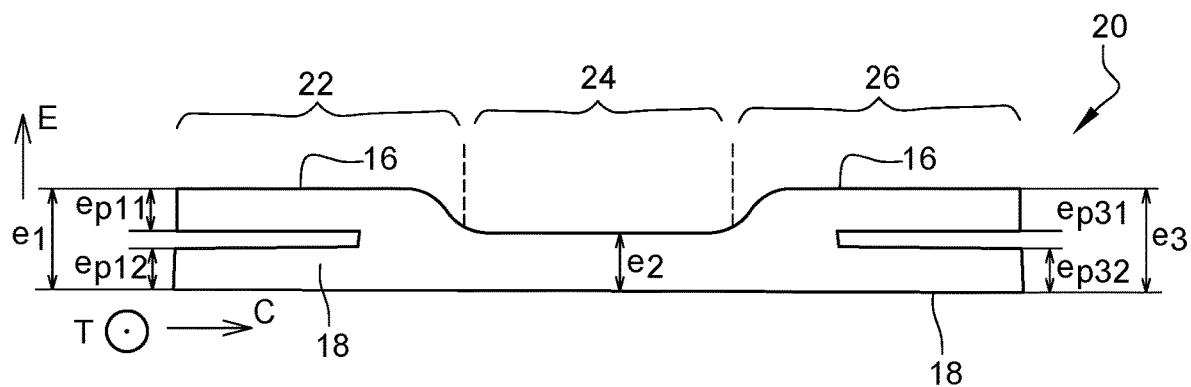
Fig. 4

METHOD FOR MANUFACTURING A RING SECTOR

CROSS-REFERENCE TO RELATED APPLICATIONS

This application is a 35 U.S.C. § 371 filing of International Application No. PCT/FR2020/050952 filed Jun. 3, 2020, which claims the benefit of priority to French Patent Application No. 1905867 filed Jun. 3, 2019, each of which is incorporated herein by reference in its entirety.

TECHNICAL FIELD OF THE INVENTION

The present invention relates to the manufacturing of a fibrous structure for the production of composite parts intended to be integrated, for example, in a turbomachine.

PRIOR ART

Composite parts, in particular ceramic matrix composite (CMC) parts, are increasingly used to replace metal parts in turbomachines. Indeed, CMC parts have particularly interesting mechanical properties at high temperatures, ideal for the design of, for example, turbine nozzles or stators. In these two examples, sectorised CMC parts are arranged and assembled on a metal housing and connected to each other by tight connections, in order to ensure the tightness of the vein despite the thermal expansions generated by the high operating temperatures.

In the aeronautical field, for the applications mentioned above, the CMC materials used are based on SiC fibres and a SIC matrix.

The SiC fibres are integrated into the CMC material in the form of fibrous structures, for example by three-dimensional weaving. This is multi-layer weaving using several layers of weft yarns and several layers of warp yarns, with warp yarns binding together different layers of weft yarns. Different types of 3D weaves can be used, e.g. interlock, multi-satin, multi-woven, multi-twill weaves.

FIG. 1 shows a stator sector 2 which is intended to be mounted radially opposite the tips of moving vanes. It comprises two radial flanges 4 axially spaced from each other and internally connected to an annular wall sector 6 which comprises a central portion 8 connecting the two flanges 4 and fairings 10 extending in opposite directions from the axial ends of the central portion 8. The terms "radial" and "axial" are to be considered in relation to the axis A of the angular sector, this axis corresponding to the axis around which a plurality of sectors are intended to be arranged to surround a bladed wheel.

As can be seen in FIG. 1, the central portion 8, also known as the bathtub, has a thickness $e_{pc}$ greater than the thickness of the fairings $e_b$. The thickness is measured in the radial direction. This is directly related to the manufacturing process of the fibrous structure 12.

In order to produce the ring sector 2 of FIG. 1, a fibrous structure 12 as shown in FIG. 2 is first produced.

This fibrous structure 12 comprises a central part 14 connected, at each of its ends, to a first 16 and a second 18 portion, untied between them. The central portion 14 of the fibrous structure 12 is intended to form the central part 8 of the ring sector 2 and the first 16 and second 18 portions are intended to form the fairings 10 and the flanges 4 of the ring sector 2.

The central part 14 comprises x layers of woven warps, the first portions 16 each comprising z layers of woven warps and the second portions 18 each comprising y layers of woven warps. The warp layers are arranged in a thickness, indicated in the figure by the direction E.

The absence of a thickness connection between the first 16 and second 18 portions allows them to be structurally independent of each other and thus to be shaped in different directions in a mould.

Thus, once the fibrous structure 12 is obtained, it is shaped to have a similar shape to the desired part, i.e. "Pi" in the example considered, as shown in FIG. 3. The first portions 16, on either side of the central part 14, are thus deployed so as to obtain a fibrous preform with the "Pi" topology of the ring sector 2 shown in FIG. 1.

With today's weaving technique, the warp/weft ratio is the same at all points of the woven piece. Thus, the number of warp layers of the central part 14 depends on the number of warp layers of the first 16 and second 18 portions, and are related by the following formula x=y+Z.

The interdependence of the number of layers of warp and weft, with a constant warp/weft ratio, and therefore of their respective thicknesses, of the central part 14 and of the first 16 and second 18 portions, generates a thickness, functionally unnecessary, at the central part 14. Indeed, the central part 8 functionally requires a minimum thickness $e_{pc}$ equivalent to the thickness $e_b$ of the fairings 10. It is also possible to have a thickness $e_{pc}$ of the central part 8 that is substantially greater than the thickness $e_b$ of the fairings 10. This excess thickness results in the use of a functionally unnecessary amount of fibrous material, which is an expensive element.

It is therefore necessary, for reasons of cost and also mass, to reduce the thickness of the central part 14 of the fibrous structure 12, and thus to obtain a fibrous structure 12 of variable thickness.

A solution called "trimming" is used in the design of organic matrix composite (OMC) vanes. This method consists of removing warp and weft yarns from the fibrous structure by changing the weave. The exiting yarns are then cut, resulting in a fibrous structure with a thickness that evolves along the warp direction.

Such a method cannot be used for a CMC ceramic matrix composite part, in particular because of the fragility of the fibres used. The trimming method would then weaken the resulting fibrous structure, and consequently the preform.

In addition, the small dimensions of the above-mentioned parts mean that the preforms are small and it is difficult to produce warp yarns which would then be cut using the rimming process.

The invention aims to remedy such drawbacks in a simple, reliable and inexpensive way.

SUMMARY OF THE INVENTION

The present document firstly relates to a three-dimensionally woven multilayer fibrous structure having the same number of warp yarns woven at any level along the warp direction, the fibrous structure comprising, in the warp direction, a first part and a second part, the first part having a thickness measured in a direction perpendicular to the warp and weft directions, greater than the second part, characterised in that the spacing between two weft planes along the warp direction is greater in the second part than in the first part, and in that the number of weft yarns is lower in the second part than in the first part.

Thus, by varying the warp-weft ratio by adjusting two parameters, the spacing between two successive weft columns along the warp direction and the local insertion or disengagement of weft yarns, the thickness of the second part is no longer dependent on the thickness of the first part. The fibrous structure then obtained by three-dimensional weaving has a thickness of the first part greater than the thickness of the second part.

The number of weft yarns per weft plane of the second part may be less than the number of weft yarns per weft plane of the first part.

This method is therefore compatible with the production of fibrous structures for CMC parts, as it does not require the use of the trimming method to vary thickness.

The first part of the fibrous structure may comprise a first portion and a second portion, the first portion being arranged, in said perpendicular direction, over a second portion and being structurally independent of the second portion, said first portion and second portion of the first part being woven to the second part at a transition from the first part to the second part.

In particular, the first and second portions of the fibrous structure constitute the elements of the fibrous structure that will form the fairing and flange of the ring sector when shaped. A conformation in directions, preferably perpendicular, of the first and second portions is permitted by this structural independence.

The number of weft yarns may be greater than the number of warp yarns in either the first or second portion.

Another possibility to reduce the thickness of the second part is to vary the warp-weft ratio at the first part, i.e., at the first and second portions of the first part. This reduces the number of layers of warps to be woven in the second part.

In the second part, the number of weft yarns may be less than the number of warp yarns.

The non-insertion of certain weft yarns, present in the basic weave, is thus carried out in order to modify the warp/weft ratio, by modifying or not the spacing between the weft columns, within the limit of a 75/25 ratio, thus making it possible to reduce the thickness compared to the thickness of the first part.

The distance between two warp planes can be the same between the first part and the second part. In practice, this is simpler to achieve than variable spacing.

The spacing between two weft planes can be the same between the first and second part, and the spacing between two warp planes can be different between the first part and the second part.

In the particular case, not illustrated, of weaving parts at 90° to the orientation presented in this document, it is possible to play with the spacing between two successive warp planes and keep the spacing between two successive weft planes constant.

In practice, it is easier to change the weft parameters on the loom. This makes it easier to set the parameters related to the spacing between two successive layers of chains and the number of chains in the first and second parts.

The fibrous structure may comprise a third part identical to the first part and woven to the second part along the warp direction opposite the first part.

The first part of the fibrous structure may comprise a first portion and a second portion, the first portion being arranged, in said perpendicular direction, over a second portion and being structurally independent of the second portion, said first portion and second portion of the first part being woven to the second part at a transition from the first part to the second part.

The number of weft yarns per weft plane of the second part may be less than the number of weft yarns per weft plane of the first part. In this example, the fibrous structure has an axis of symmetry, similar to the ring sector shown above. The fibrous structure is therefore shaped into a "Pi" shape close to the desired ring sector. Thus, such a fibrous structure can form a preform with a thickness at the second part that may be less than or equal to the thickness of the first part and the third part. The second part, which forms the central part or bathtub in the fibre preform, then has a thickness that is suitable and sufficient for the thermal and mechanical requirements necessary for the use of this part.

The present document also relates to a method for manufacturing a fibrous structure as described above, wherein during the transition in the warp direction from the first part of the fibrous structure to the second part of the fibrous structure, the number of weft yarns is decreased and the spacing between two successive weft planes along the warp direction is increased.

The present document also relates to a method for manufacturing a fibrous structure as described above, wherein during the transition in the warp direction from the second part of the fibrous structure to the first part of the fibrous structure, the number of weft yarns is decreased and the spacing between two successive weft planes along the warp direction is increased.

The present document also relates to a method for manufacturing a composite material, comprising the following steps:
  a) Obtaining a fibrous structure by means of the method as described above;
  b) Shaping the fibrous structure;
  c) Obtaining a composite material by injecting a matrix into the fibrous structure.

The resulting composite material then contains a reduced amount of fibrous material, thereby reducing its production cost and mass.

The invention will be better understood and other details, characteristics and advantages of the invention will appear when reading the following description, which is given as a non-limiting example, with reference to the attached drawings

BRIEF DESCRIPTION OF THE FIGURES

FIG. 1 described above, is a perspective view of a ring sector according to the prior art;

FIG. 2 described above, is a schematic representation of a fibrous structure for the manufacture of the ring sector of FIG. 1 obtained according to the prior art;

FIG. 3 described above, is a schematic representation of the 3D Pi conformation of the fibrous structure of a ring sector;

FIG. 4 is a schematic illustration of the fibrous structure according to the invention;

DETAILED DESCRIPTION OF THE INVENTION

Figure 5:
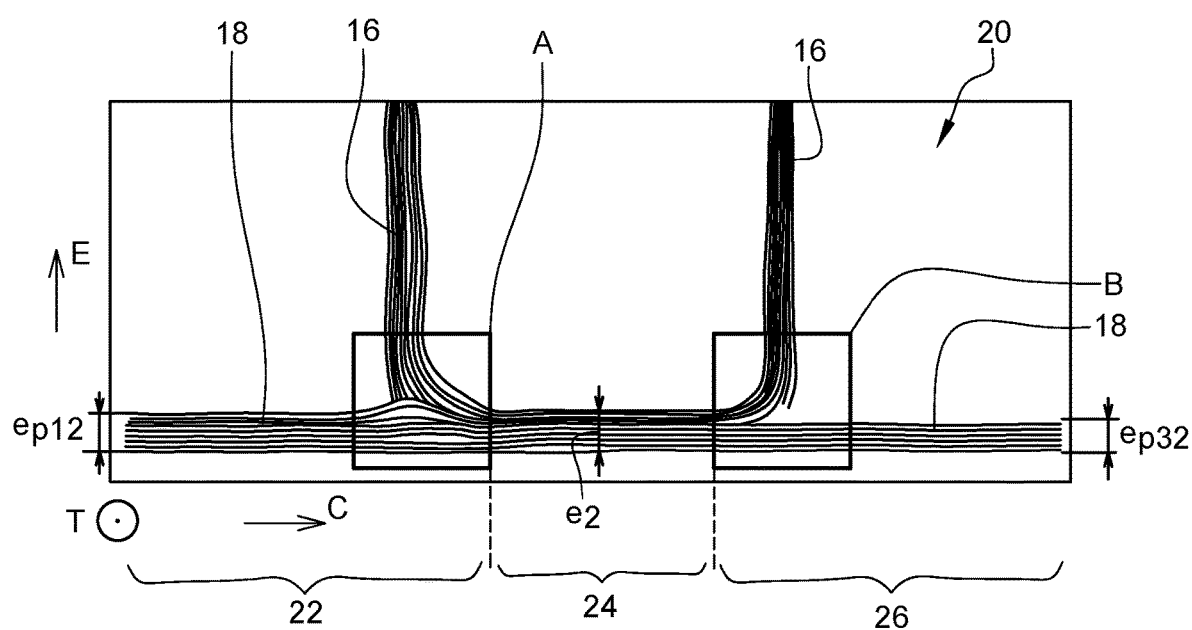
FIG. 5 is a diagram of a ring sector incorporating the fibrous structure of FIG. 4.

In the embodiments detailed below, the fibrous structure woven from SiC fibres preferably has a target fibre content of between 25 and 50% by volume.

FIG. 5 is a diagram of a fibrous structure 20 according to the invention in which a warp direction C and a weft direction T and a direction E are shown, these directions being perpendicular to each other. This fibrous structure 20 has the same number of warp yarns woven at any level of the fibrous structure along the warp direction C.

The fibrous structure 20 comprises a first part 22, a second part 24 and a third part 26 along the warp direction C, best seen in the schematic illustration of the fibrous structure 20 before shaping. The first 22, second 24 and third 26 parts each have a thickness $e_1$, $e_2$, $e_3$ measured in a direction E perpendicular to the warp and weft directions. In this example, the fibrous structure 20 comprises a second part 24 whose thickness $e_2$ is lower than the thickness $e_1$, $e_2$ of each of the first part 22 and the third part 26.

The first 22 and third 26 parts each comprise a first portion 16 and a second portion 18. Once the fibrous structure 20 has been formed into the shape of Pi as seen in FIG. 5, the first portions 16 of the first 22 and third 26 parts are arranged to form a non-zero angle, preferably between 0° and 45°, with the second portions 18 of the first 22 and third 26 parts respectively. Prior to this shaping of the fibrous structure 20, i.e. at the end of the three-dimensional weaving, for each of the first 22 and third 26 parts, the first portion 16 is arranged above the second portion 18 along the E-direction, also called the thickness direction. The first 16 and second 18 portions, although woven simultaneously, are structurally independent, i.e. they are not woven to each other, which allows an arrangement of the first 16 portions at a non-zero angle to the second 18 portions and the second 24 part. The first 16 and second 18 portions of the first 22 and third 26 parts each have a thickness, in the E direction, of $e_{p11}$, $e_{p12}$, $e_{p31}$ and $e_{p32}$ respectively, such that $e_{p11}+e_{p12}=e_1$ et $e_{p31}+e_{p32}=e_3$.

For the following, it will be assumed that the thicknesses of the first and second portions are identical for the first and third parts, i.e $e_{p11}=e_{p31}$ et $e_{p12}=e_{p32}$.

Of course, it is possible that the thicknesses $e_1$ and $e_3$ are different, and also that the thicknesses $e_{p11}$, $e_{p31}$, $e_{p12}$ et $e_{p32}$ are different from each other in pairs.

The first portion 16 and the second portion 18 of the first part 22 are woven to the second part 24 at a transition from the first part 22 to the second part 24. The first portion 16 and the second portion 18 of the third part 26 are woven to the second part 24 at a transition from the third part 26 to the second part 24. These transitions, indicated by two boxes A and B, correspond to an intertwining of the wires from the first portion 16 and the second portion 18 of the first part 22, to form the second part 24.

The fibrous structure 20 is characterised by the spacing between two weft planes along the warp direction C being greater in the second part 24 than in the first part 22 and the third part 26. In addition, the number of weft yarns is lower in the second part 24 than in the first part 22 and in the third part 26. The number of weft yarns per weft plane of the second part may be less than the number of weft yarns per weft plane of the first part. The number of weft yarns per weft plane of the second part may be less than the number of weft yarns per weft plane of the first part. This allows the warp-weft ratio of the first 22 and third 26 parts to be influenced relative to that of the second part 24, to limit the thickness of the second part 24, without trimming. The second part 24 of the fibrous structure 20 thus has a thickness such that $e_2 \leq e_1$ et $e_2 \leq e_3$.

Table 1 below illustrates an example of a fibrous structure 12 according to the prior art, comprising a first part and a second part comprising a first portion 16 and a second portion 18, wherein the second part 14 has a thickness $e_2 > e_{p12}$ and in particular wherein $e_1=e_2$.

TABLE 1

| Areas | 1st part | | 2nd part |
|---|---|---|---|
| | 1st portion | 2nd portion | |
| Number of layers | 14 | 7 | 21 |
| Number of weft planes | 14 | 7 | 21 |
| Number of warp planes | 14 | 7 | 21 |
| Warp spacing (mm) | 1.25 | 1.25 | 1.25 |
| Weft spacing (mm) | 1.25 | 1.25 | 1.25 |
| WWR (warp/weft ratio) | 50/50 | 50/50 | 50/50 |
| Moulding thickness (mm) | 4 | 2 | 6 |

This fibrous structure 12 made in the previous technique from 21 textile layers by a three-dimensional multi-layer weaving of the fibrous structure 12 has a warp-weft ratio of 50/50 invariant in the different parts of the fibrous structure 12.

In this case, the number of layers, warp and weft planes in the second part 14 is equal to the sum of the number of layers, warp and weft planes in the first 16 and second 18 portions of the second part 14 (and the third part if applicable), respectively.

The fibrous structure 20 according to the invention makes it possible to limit the thickness $e_2$ of the second part 24, intended to form the bathtub, so that its thickness $e_2$ is close to the thickness $e_{p12}$ of the second portion 18 of the first part 22 (and the third part 26 if applicable). In other words, $e_1$, $e_2$ and $e_3$ can thus be different and this without trimming.

Table 2 illustrates a fibrous structure 20 according to a first embodiment of the invention, comprising a first part 22 and a second part 24 comprising a first 16 and a second 18 portion:

TABLE 2

| Areas | 1st part | | 2nd part |
|---|---|---|---|
| | 1st portion | 2nd portion | |
| Number of layers | 14 | 7 | 21 |
| Number of weft planes | 14 | 7 | 9 |
| Number of warp planes | 14 | 7 | 21 |
| Warp spacing (mm) | 1.25 | 1.25 | 1.25 |
| Weft spacing (mm) | 1.25 | 1.25 | 1.5 |
| WWR (warp/weft ratio) | 50/50 | 50/50 | 74/26 |
| Moulding thickness (mm) | 4 | 2 | 4.1 |

The thickness $e_2$ of the second part 24 of this fibrous structure 20, once shaped, is reduced to 4.1 mm, with parameters for the first 16 and second 18 portions of the first part 22 unchanged from table 1 illustrating the prior art. For this purpose, the spacing between two weft planes along the warp direction is increased from 1.25 mm to 1.5 mm so that it is greater than the spacing between two consecutive weft planes in the first part 22, in particular in the first 16 and second 18 portions of the first part 22. Furthermore, the number of weft yarns of the second part 24 is lower than the sum of the numbers of weft yarns of the first part 22, i.e. the sum of the weft yarns of the first 16 and second 18 portions of the first part 22, by locally disengaging weft yarns at the transition A between the first 22 and second 24 parts, in order to achieve a warp-weft ratio close to the 75/25 limit.

Thus, the combination of increasing the spacing between two consecutive weft planes and not inserting weft yarns locally, so as to reduce the weft planes [, unbalances the warp-weft ratio, in the example shown at 74/26. This allows the thickness $e_2$ of the second part 24 of the fibrous structure 20 intended to form the bathtub of the ring sector to be reduced by 1.9 mm compared to the prior art fibrous structure 12 illustrated in table 2.

Thus, in the second part 24 of the fibrous structure 20, the number of weft yarns is lower than the number of warp yarns, respectively 9 and 21. For practical reasons, the imbalance in the warp-weft ratio is achieved by adjusting the spacing between two successive weft planes, not the spacing between two successive warp planes. As a result, the distance between two warp planes is identical between the first part 22 and the second part 24.

In the particular case, not illustrated, of weaving parts at 90° to the orientation presented in this document, it is possible to play with the spacing between two successive warp planes and keep the spacing between two successive weft planes constant.

Although the example illustrated here describes the particular situation with a fibrous structure 20 having a first 22 and second 24 part, the fibrous structure 20 may comprise a third part 26 identical to the first part 22 and woven to the second part 24 along the warp direction opposite the first part 22.

Table 3 illustrates a fibrous structure 20 according to a first embodiment of the invention, comprising a first part 22 and a second part 24 comprising a first 16 and a second 18 portion:

TABLE 3

| Areas | 1st part | | 2nd part |
|---|---|---|---|
| | 1st portion | 2nd portion | |
| Number of layers | 10 | 6 | 16 |
| Number of weft planes | 15 | 7 | 16 |
| Number of warp planes | 10 | 6 | 16 |
| Warp spacing (mm) | 1.25 | 1.25 | 1.25 |
| Weft spacing (mm) | 1 | 1 | 1.5 |
| WWR (warp/weft ratio) | 35/65 | 41/59 | 55/45 |
| Thickness obtained in moulding (mm) | 4.1 | 2.1 | 4.2 |

In this structure 20, the warp-weft ratio is varied in the first 16 and second 18 portions of the first part 22, in order to reduce the number of textile layers subsequently woven in the second part 24.

Thus, in the second portion 18 of the first part 22, the number of weft planes is greater than the number of warp planes. In the first portion 16 of the first part 22, the number of weft planes is 1.5 times the number of warp planes. The spacing between two successive weft planes in the first 16 and second 18 portions is reduced to 1 mm.

The modification of these parameters, unbalancing the warp-weft ratio of the first 16 and second 18 portions to 41/59 and 35/65 respectively, combined with an increase in the spacing between two successive weft planes, thus makes it possible to obtain, for a thickness of 2.1 mm and 4.1 mm respectively for the first 16 and second 18 portions of the shaped fibrous structure 20, a thickness $e_2$ of the second part 24 equal to 4.2 mm.

In this example of a fibrous structure 20, the number of weft yarns is greater than the number of warp yarns in the first portion 16 and in the second portion 18 of the first part 22 of the fibrous structure 20.

The invention also relates to a fibrous structure 22, the thickness of which $e_2$ of the second part 24 is lower than the thickness of the first portion 22, i.e. the sum of the thicknesses of the first 16 and second 18 portions. Table 4 illustrates a third embodiment of the invention:

TABLE 4

| Areas | 1st part | | 2nd part |
|---|---|---|---|
| | 1st portion | 2nd portion | |
| Number of layers | 10 | 6 | 16 |
| Number of weft planes | 15 | 7 | 7 |
| Number of warp planes | 10 | 6 | 16 |
| Warp spacing (mm) | 1.25 | 1.25 | 1.25 |
| Weft spacing (mm) | 1 | 1 | 1.5 |
| WWR (warp/weft ratio) | 35/65 | 41/59 | 73/27 |
| Thickness obtained in moulding (mm) | 4.1 | 2.1 | 3.1 |

Keeping the parameters of the first 16 and second 18 portion of the first part 22 of the fibrous structure 20 of the example in table 3, the thickness of the second part 24 is further reduced, changing the warp-weft ratio to 73/27 by reducing the number of weft planes of the second part 24 of the fibrous structure 20 from 16 to 7.

A thickness of 3.1 mm is then obtained for this second part 24 compared to 4.2 mm for the structure described with reference to table 3.

Thus, the invention also relates to the method of making the fibrous structures 20 as described with reference to tables 2 to 4.

The method for manufacturing the weaving of a fibrous structure 20 according to the invention thus comprises a step consisting of decreasing the spacing between two successive weft planes along the warp direction and decreasing the number of weft yarns during a transition in the warp direction from a first part of the fibrous structure to a second part 24 of the fibrous structure 20 having a thickness greater than that of the first part 22.

The manufacturing process also includes a step of increasing the number of weft yarns and decreasing the spacing between two successive weft planes along the warp direction, during the transition in the warp direction from the second part 24 of the fibrous structure 20 to the first part 22 of the fibrous structure 20.

The resulting fibrous structures 20 can then be used to manufacture a composite part, for example a stator sector 12, as described above.

Thus, the invention also relates to a method for manufacturing a composite material, comprising the following steps:
a) Obtaining a fibrous structure 20 by means of the method as presented above;
b) Shaping the fibrous structure 20;
c) Obtaining a composite material by injecting or densifying a matrix inside the fibrous structure.

Step b) consists in obtaining from the fibrous structure 20 a fibrous preform intended to form the fibrous reinforcement of the composite part. This fibrous preform has a shape similar to that of the composite part. Thus, in the example of a stator sector 12 as described above, the woven fibrous structure 20 is "Pi" shaped, that is, the first portions 16 of the first 22 and third 26 parts of the fibrous structure 20, are arranged so as to form an angle with the second portions 18 of the first 22 and third 26 parts and with the second part 24 (the latter three being substantially aligned). This is done with the help of shaping tools, allowing the preform to be held in a shape close to that of the part to be manufactured.

The composite part is then obtained by densifying the fibrous preform, i.e. by injecting a matrix inside the shaped fibrous structure. The matrix may be a resin or, in the case of a thermostructural composite, a refractory material such as carbon or ceramic.

The matrix injection can be carried out for example by Chemical Vapour Infiltration (CVI), by the process known by the acronym PIP for Polymer Infiltration and Pyrolysis or any other process conventionally known for the design of CMC parts.

The invention claimed is:

1. A three-dimensionally woven multilayer fibrous structure having the same number of warp yarns woven at any level along the warp direction, the fibrous structure comprising, in the warp direction, a first part and a second part, the first part having a thickness measured in a direction perpendicular to the warp and weft directions, greater than the second part,
characterised in that
the spacing between two weft planes along the warp direction is greater in the second part than in the first part, and
in that the number of weft yarns per weft plane of the second part is lower than the number of weft yarns per weft plane of the first part,
the first part of the fibrous structure comprising a first portion and a second portion, the first portion being arranged in said perpendicular direction, over a second portion and being structurally independent of the second portion, said first portion and second portion of the first part being woven to the second part at a transition from the first part to the second part.

2. A fibrous structure according to claim 1, wherein the number of weft yarns is greater than the number of warp yarns in one and/or other of the first portion and the second portion.

3. A fibrous structure according to claim 1, wherein in the second part the number of weft yarns is lower than the number of warp yarns.

4. A fibrous structure according to claim 1, wherein the spacing between two warp planes is identical between the first part and the second part.

5. A fibrous structure according to claim 1, wherein the spacing between two warp planes is different between the first part and the second part.

6. A fibrous structure according to claim 1, comprising a third part identical to the first part and woven to the second part along the warp direction opposite the first part.

7. A method for manufacturing a fibrous structure according to claim 1, wherein during the transition in the warp direction from the first part of the fibrous structure to the second part of the fibrous structure, the number of weft yarns is reduced and the spacing between two successive weft planes along the warp direction is increased.

8. A method for manufacturing a composite material, comprising the following steps:
a) Obtaining a fibrous structure by means of the method according to claim 7;
b) Shaping the fibrous structure;
c) Obtaining a composite material by injecting a matrix inside the fibrous structure.

9. A method for manufacturing a fibrous structure according to claim 1, wherein during the transition in the warp direction from the second part of the fibrous structure to the first part of the fibrous structure, the number of weft yarns is reduced and the spacing between two successive weft planes along the warp direction is increased.

10. A method for manufacturing a composite material, comprising the following steps:
a) Obtaining a fibrous structure by means of the method according to claim 9;
b) Shaping the fibrous structure;
c) Obtaining a composite material by injecting a matrix inside the fibrous structure.

11. A three-dimensionally woven multilayer fibrous structure having the same number of warp yarns woven at any level along the warp direction, the fibrous structure comprising, in the warp direction, a first part and a second part, the first part having a thickness measured in a direction perpendicular to the warp and weft directions, greater than the second part,
characterised in that
the spacing between two weft planes along the warp direction is greater in the second part than in the first part, and
in that the number of weft yarns per weft plane of the second part is lower than the number of weft yarns per weft plane of the first part,
the first part of the fibrous structure comprising a first portion and a second portion, the first portion being arranged in said perpendicular direction, over a second portion and being structurally independent of the second portion, said first portion and second portion of the first part being woven to the second part at a transition from the first part to the second part;
wherein the number of weft yarns is greater than the number of warp yarns in one and/or other of the first portion and the second portion.

12. A fibrous structure according to claim 11, wherein in the second part the number of weft yarns is lower than the number of warp yarns.

13. A fibrous structure according to claim 11, wherein the spacing between two warp planes is identical between the first part and the second part.

14. A fibrous structure according to claim 11, wherein the spacing between two warp planes is different between the first part and the second part.

15. A fibrous structure according to claim 11, comprising a third part identical to the first part and woven to the second part along the warp direction opposite the first part.

16. A method for manufacturing a fibrous structure according to claim 11, wherein during the transition in the warp direction from the first part of the fibrous structure to the second part of the fibrous structure, the number of weft yarns is reduced and the spacing between two successive weft planes along the warp direction is increased.

17. A method for manufacturing a composite material, comprising the following steps:
a) Obtaining a fibrous structure by means of the method according to claim 16;
b) Shaping the fibrous structure;
c) Obtaining a composite material by injecting a matrix inside the fibrous structure.

18. A method for manufacturing a fibrous structure according to claim 11, wherein during the transition in the warp direction from the second part of the fibrous structure to the first part of the fibrous structure, the number of weft yarns is reduced and the spacing between two successive weft planes along the warp direction is increased.

19. A method for manufacturing a composite material, comprising the following steps:
a) Obtaining a fibrous structure by means of the method according to claim 18;
b) Shaping the fibrous structure;

c) Obtaining a composite material by injecting a matrix inside the fibrous structure.

20. A three-dimensionally woven multilayer fibrous structure having the same number of warp yarns woven at any level along the warp direction, the fibrous structure comprising, in the warp direction, a first part and a second part,
the first part having a thickness measured in a direction perpendicular to the warp and weft directions, greater than the second part,
characterised in that
the spacing between two weft planes along the warp direction is greater in the second part than in the first part, and
in that the number of weft yarns per weft plane of the second part is lower than the number of weft yarns per weft plane of the first part,
the first part of the fibrous structure comprising a first portion and a second portion, the first portion being arranged in said perpendicular direction, over a second portion and being structurally independent of the second portion, said first portion and second portion of the first part being woven to the second part at a transition from the first part to the second part,
wherein the spacing between two warp planes is identical between the first part and the second part.

* * * * *